United States Patent
Jeng

(10) Patent No.: US 9,207,790 B2
(45) Date of Patent: Dec. 8, 2015

(54) TOUCH DISPLAY APPARATUS AND METHOD FOR FABRICATING THE SAME

(71) Applicant: InnoLux Corporation, Miao-Li County (TW)

(72) Inventor: Yue-Shih Jeng, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 188 days.

(21) Appl. No.: 13/742,967

(22) Filed: Jan. 16, 2013

(65) Prior Publication Data

US 2013/0188103 A1    Jul. 25, 2013

(30) Foreign Application Priority Data

Jan. 20, 2012   (TW) .............................. 101102434 A

(51) Int. Cl.
  *G02F 1/1335* (2006.01)
  *G06F 3/041* (2006.01)
  *G02F 1/1333* (2006.01)

(52) U.S. Cl.
  CPC ............ *G06F 3/041* (2013.01); *G02F 1/13338* (2013.01); *G06F 3/0412* (2013.01); *G02F 2001/133354* (2013.01); *G06F 2203/04103* (2013.01); *Y10T 29/49002* (2015.01)

(58) Field of Classification Search
  CPC ............................ G02F 1/13338; G06F 3/041
  USPC ...................................... 349/12, 158; 345/173
  See application file for complete search history.

(56) References Cited

U.S. PATENT DOCUMENTS

| | | | |
|---|---|---|---|
| 2006/0274255 A1* | 12/2006 | Yi et al. ........................ | 349/158 |
| 2010/0026662 A1* | 2/2010 | Oohira ........................ | 345/174 |
| 2012/0287357 A1 | 11/2012 | Misaki | |
| 2012/0319966 A1* | 12/2012 | Reynolds ...................... | 345/173 |
| 2014/0204060 A1 | 7/2014 | Ishizaki et al. | |
| 2014/0362020 A1* | 12/2014 | Rothkopf et al. ............. | 345/173 |

FOREIGN PATENT DOCUMENTS

| | | |
|---|---|---|
| TW | 201104303 | 2/2011 |
| TW | 201145130 | 12/2011 |
| WO | WO 2011/053742 | 5/2011 |
| WO | WO 2011/086766 | 7/2011 |

OTHER PUBLICATIONS

Taiwanese language office action dated May 29, 2014.
English language translation of abstract of TW 201104303 (published Feb. 1, 2011).
English language translation of abstract of TW 201145130 (published Dec. 16, 2011).
Chinese language office action dated Aug. 5, 2015, issued application No. CN 201210019080.6.

* cited by examiner

*Primary Examiner* — Nathanael R Briggs
(74) *Attorney, Agent, or Firm* — McClure, Qualey & Rodack, LLP

(57) ABSTRACT

A method of fabricating a touch display apparatus is provided which includes: forming a first substrate on a first carrier; forming an assembly part on a second carrier, wherein the assembly part includes a second substrate, a third substrate and a touch sensing layer interposed therebetween, and the third substrate is relatively near a side of the second carrier; assembling the first substrate and the assembly part such that a display layer is formed between the first substrate and the assembly part; and at least removing the first carrier. In addition, a touch display fabricated from the above method is also provided.

8 Claims, 11 Drawing Sheets

TOUCH DISPLAY APPARATUS AND METHOD FOR FABRICATING THE SAME

This application claims priority of Taiwan Patent Application No. 101102434, filed on Jan. 20, 2012, the entirety of which is incorporated by reference herein.

BACKGROUND

1. Field

The present invention relates to a touch display apparatus. More particularly, the present invention relates to a touch display apparatus having a reduced thickness with high alignment accuracy between a touch panel and a display panel and a method of fabricating thereof.

2. Description of the Related Art

Conventional input devices, such as a keyboard or mouse, have been gradually replaced by touch devices for a convenient user interface. The touch device is capable of being mounted on various flat display apparatuses such that the touch and display functions can be simultaneously implemented on a touch display apparatus. Typically, the touch panel is mounted on a liquid crystal panel or an OLED display panel, for apparatuses such as tablets or smart phones.

In the conventional method of fabricating a touch display apparatus, the display panel and the touch panel are fabricated individually and then adhere to each other. Thus, each of the display panel and the touch panel needs an upper substrate and a lower substrate. These substrates are usually glass substrates having the disadvantages of being thick and heavy. The substrates of the display panel may be thinned by a thinning process after they are assembled to each other. However, the substrates can't be further thinned after the display panel and touch panel are assembled, and therefore the thickness of the touch display apparatus cannot be further reduced. In addition, both the upper and the lower substrates of the display panel would have an alignment mark, and the assembling of the upper and the lower substrates of the display panel by aligning the alignment marks has an alignment tolerance of less than about 5 µm. However, the dimensions of active areas of the display panel and the touch panel are different. The alignment marks used to align the upper and lower substrates of the display panel and the alignment marks used to align the upper and lower substrates of the touch panel are not overlapped when assembling the display panel and the touch panel. Thus, an additional alignment mark for aligning the touch panel to the display panel is needed, and the assembling of the display panel and the touch panel can only have an alignment tolerance of between around 70 and 80 µm. Moreover, the yield would be significantly lowered and the cost would be increased when trying to reduce the alignment tolerance of the assembling of the display panel and the touch panel. Thus, the conventional method is not suitable for fabricating a touch display apparatus having a high resolution display panel, in particular a 3D touch display apparatus.

Therefore, a touch display device capable of addressing the above issues and a method of fabricating thereof are needed.

BRIEF SUMMARY

One object of the present invention is to provide a method of fabricating a touch display apparatus, comprising: forming a first substrate on a first carrier; forming an assembly part on a second carrier, wherein the assembly part comprises a second substrate, a third substrate and a touch sensing layer interposed therebetween, and the third substrate is relatively near a side of the second carrier; assembling the first substrate and the assembly part such that a display layer is formed between the first substrate and the assembly part; and at least removing the first carrier.

Another object of the present invention is to provide a touch display apparatus, comprising: a display layer between a first substrate and a second substrate; a touch sensing layer disposed over the second substrate; a third substrate disposed on the touch sensing layer and having a thickness of less than 0.3 mm; and a protection layer disposed on the third substrate.

BRIEF DESCRIPTION OF THE DRAWINGS

The invention will now be described, by way of example, with reference to the accompanying drawings, in which.

DETAILED DESCRIPTION

A touch display apparatus having a reduced thickness with high alignment accuracy between a touch panel and a display panel and a method of fabricating thereof in accordance with one or more embodiments of the present disclosure are provided.

Figure 1A:
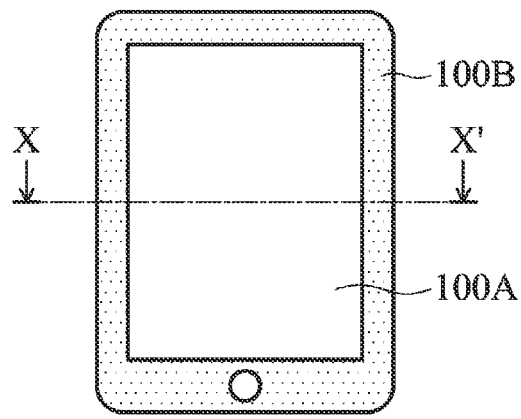
FIGS. 1A and 1B show a top view and a cross-section view of a touch display apparatus in accordance with an embodiment of the present disclosure, respectively.
Figure 1B:
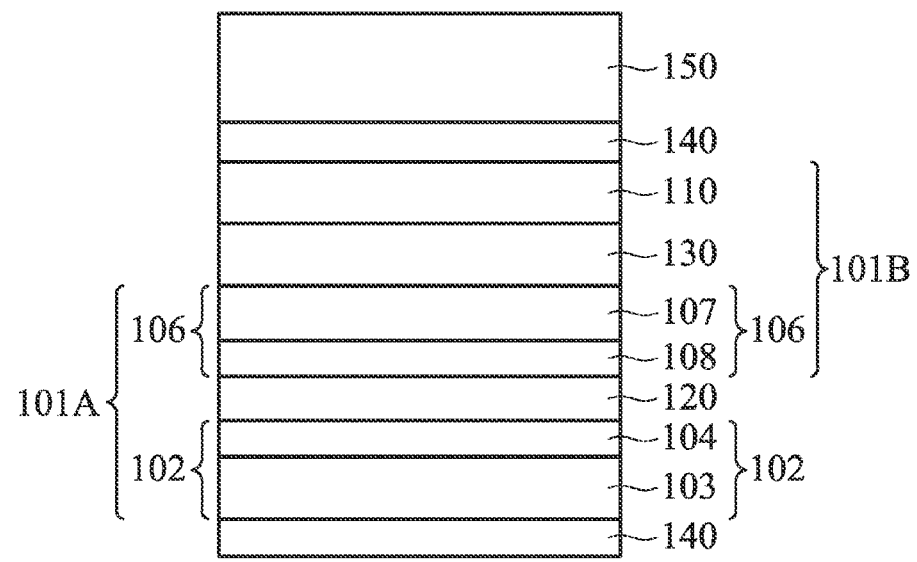

FIGS. 1A and 1B show a top view and a cross-section view of a touch display apparatus in accordance with an embodiment of the present disclosure, respectively. Referring to FIG. 1A, the touch display apparatus may comprise a touch display area 100A and a peripheral area 100B. Touch and display features may be formed in the touch display area 100A. Signal transmission traces and opaque masks may be formed in the peripheral area 100B. A physical button, if needed, may be formed in the peripheral area 100. The touch display area 100A and the peripheral area 100B may be covered by a protection covering for being touched by the user. FIG. 1B shows a cross-section view along the section X-X' shown in FIG. 1A. The touch display apparatus may comprise a display panel 101A and a touch panel 101B using a common substrate. For example, as shown in FIG. 1B, the touch display apparatus may comprise a first substrate 102, a second substrate 106 and a third substrate 110, and the second substrate 106 is the common substrate of the display panel 101A and the touch panel 101B. The display panel 101A may comprise the first substrate 102, the second substrate 106 and a display layer 120 interposed therebetween for imaging. The touch panel 101B may comprise the second substrate 106, a third substrate 110 and a touch sensing layer 130 interposed therebetween for sensing input information from the outside. The touch display apparatus may further comprise a protection layer 150, such as the protection covering, disposed on the touch panel 101B for sufficiently sealing and physically protecting the display panel 101A and the touch panel 101B.

The first substrate 102 may be a lower substrate of the display panel 101A. The display layer 120 may comprise a liquid crystal layer or an organic light emitting diode (OLED) array. The first substrate 102 may be an array substrate which includes a glass substrate 103 with a pixel array 104 formed thereon. The glass substrate 103 may be an ultra-thin glass substrate and have a thickness of less than about 0.3 mm, or preferably less than about 0.1 mm. The pixel array 104 may be an active pixel array or a passive pixel array associated with the liquid crystal layer or the OLED array in the display layer 120. In addition, the pixel array may comprise a first alignment mark (not shown).

The second substrate 106 may be disposed on the display layer 120. The second substrate 106 may comprise a glass substrate 107 and optionally further comprises a color filter 108 formed between the glass substrate 107 and the display layer 120. The glass substrate 107 may be an ultra-thin glass substrate having a thickness of less than about 0.3 mm, or preferably less than about 0.1 mm. The color filter 108 may comprise a red color filter, a blue color filter, a green color filter and a black matrix interposed between the color filters of different colors. As described above, the second substrate 106 may be a common substrate of the display panel 101A and the touch panel 101B.

The touch sensing layer 130 may be disposed on the second substrate 106 and include a patterned sensing electrode and a second alignment mark (not shown). The second alignment mark may be substantially aligned to the first alignment mark with an alignment tolerance of less than about 5 μm. The patterned sensing electrode may comprise a plurality of sensing electrodes arranged in rows and lines in the touch display area. Each of the sensing electrodes may be surrounded by, for example, four adjacent sensing electrodes. The sensing electrodes may be formed of indium tin oxide (ITO), zinc indium oxide, tin cadmium oxide, zinc aluminum oxide, zinc tin indium oxide, zinc oxide, cadmium oxide, hafnium oxide, indium gallium zinc oxide, indium gallium zinc magnesium oxide, indium gallium magnesium oxide or indium gallium aluminum oxide. In an embodiment, the sensing electrodes may be the ITO due to its high transparency to visible light, for example, higher than 90%. Note that since the second alignment mark in the touch sensing layer 130 is directly aligned to the first alignment mark in the first substrate 102, there is no need of an alignment mark in the second substrate 106.

The third substrate 110 acting as the upper substrate of the touch panel 101B may be disposed on the touch sensing layer 130. The third substrate 110 may comprise a glass substrate or an organic film such as a polyimide film or a polyethylene terephthalate (PET) film. The third substrate 110 may have a thickness of less than about 0.3 mm.

A polarizer 140 may be optionally disposed on an opposite side of the first substrate 102 in contrast to the display layer 120 and/or an opposite side of the third substrate 110 in contrast to the touch sensing layer 130. The protection layer 150 may be directly disposed on the third substrate 110 or on the polarizer 140 for providing sufficient physical protection to the display panel 101A and the touch panel 101B.

In accordance with one or more embodiments of the present disclosure, since the second substrate 106 is commonly used by the display panel 101A and the touch panel 101B while the glass substrates 103, 107 of the first substrate 102 and second substrate 106 are ultra-thin (less than 0.1 mm), the touch display panel apparatus could have a reduced thickness and weight. For example, the touch display apparatus may have a total thickness of less than about 0.6 mm. The display panel 101A and the touch panel 101B may have a total thickness of less than about 0.3 mm when eliminating the protection layer 150.

FIGS. 2A to 2E illustrate a method of fabricating a touch display apparatus including a liquid crystal panel in accordance with an embodiment of the present disclosure. In this embodiment, the same reference numerals represent similar or same features with preceding embodiments.

Figure 2A:
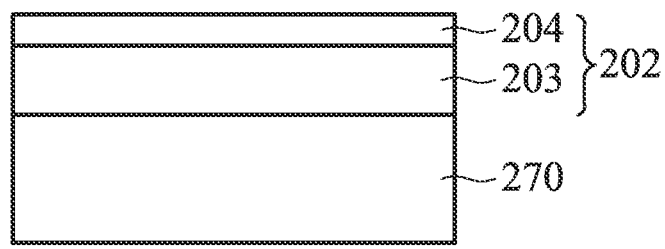
FIGS. 2A to 2E illustrate a method of fabricating a touch display apparatus including a liquid crystal panel in accordance with an embodiment of the present disclosure.

First, referring to FIG. 2A, a first substrate 202 is formed on a first carrier 270. The first substrate 202 may comprise a glass substrate 203 with a pixel array 204 formed thereon. In an embodiment, the glass substrate 203 may be an ultra-thin substrate having a thickness of less than about 0.1 mm. Alternatively, the glass substrate 203 may be normal glass which is thinned to have a thickness of less than about 0.3 mm by a thinning process. The thinning process may be a physical thinning method such as grinding or a chemical thinning method such as etching. The first carrier 270 may be a glass substrate having a sufficient mechanical support.

A pixel array 204 may be formed on the glass substrate 203 and form an active array substrate with the glass substrate 203. The pixel array 204 may comprise a plurality of pixels defined by a plurality of gate lines and data lines crossing each other. Each pixel may have a thin-film transistor (TFT). Each TFT may comprise a gate electrode electrically connected to the gate line and source/drain regions electrically connected to the data line for turning the pixel on or off. In addition, the pixel array 204 may further comprise a first alignment mark for being aligned by the touch panel. The first alignment mark may be disposed outside the pixel area, such as on any edges or corners. In an embodiment, the first alignment mark may be disposed on the peripheral area as shown in FIG. 1B. The first alignment mark may comprise a shape of rectangular, circle, triangle, oblong, other polygons, other suitable shapes, or combinations thereof. In order to simplify the Figure to clarify, as shown in FIG. 2A, only a flattened layer is represented as the pixel array 204.

Figure 2B:
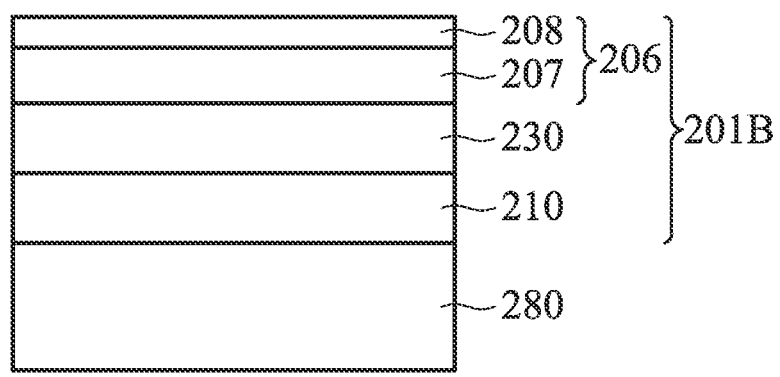

Then, referring to FIG. 2B, an assembly part is formed on a second carrier 280. The assembly part may be a touch panel 201B. The touch panel 201B may comprise a third substrate 210, a second substrate 206 and a touch sensing layer 230 interposed therebetween. The third substrate 210 may be relatively near the second carrier 280, and the second substrate 206 may be relatively far away from the second carrier 280. In addition, the third substrate 210 may have a second alignment mark. The second carrier 280 may be a glass substrate having sufficient mechanical support. The third substrate 210 may be a glass substrate or an organic film such as a polyimide film or a polyethylene terephthalate (PET) film. The third substrate 210 may have a thickness of less than about 0.3 mm. The third substrate 210 may be formed on the second carrier 280 using a depositing or adhering method. The touch sensing layer 230 may comprise a sensing area (i.e., the sensing area shown in FIG. 1A) and a peripheral area surrounding the sensing area (i.e., the peripheral area shown in FIG. 1B). The sensing area may comprise a plurality of sensing electrodes arranged in rows and lines and formed of indium tin oxide (ITO), zinc indium oxide, tin cadmium oxide, zinc aluminum oxide, zinc tin indium oxide, zinc oxide, cadmium oxide, hafnium oxide, indium gallium zinc oxide, indium gallium zinc magnesium oxide, indium gallium magnesium oxide or indium gallium aluminum oxide. In an embodiment, the sensing electrode may be the ITO. Note that, in an embodiment, since the second alignment mark is provided for being aligned by the first alignment mark, the second alignment mark may have the same size and shape with those of the first alignment mark. In order to simplify the Figure to clarify, as shown in FIG. 2B, only a flattened layer is represented as the touch sensing layer 230.

Figure 2C:
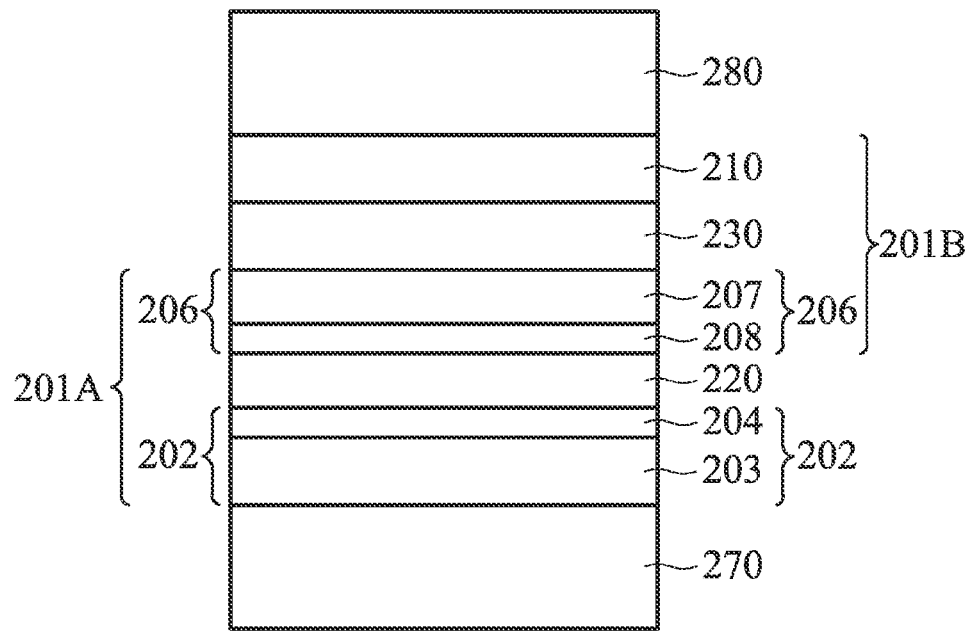

Then, referring to FIG. 2C, the first alignment mark and the second alignment mark are aligned to each other for assembling the first substrate and the assembly part. The second substrate 206 may be assembled onto the first substrate 202 with forming a display layer 220 therebetween, and a liquid crystal display panel 201A is formed. For example, in this embodiment, the first substrate 202 and the second substrate 206 may have a gap therebetween after they are assembled to each other such that a liquid crystal material may be injected into the gap to form the liquid crystal display layer 220. In an embodiment, a dam (not shown) may be used to space apart the first substrate 202 and the second substrate 206. The liquid crystal material may be any liquid crystal materials produced by known art. Since the second substrate 206 is directly disposed on the touch sensing layer 230 and is capable of acting as the upper substrate of the display panel 201A, the second alignment mark in the touch sensing layer 230 may directly align to the first alignment mark in the pixel array 204. Thus, one or more aligning processes (e.g., aligning the color filter to the pixel array) could be eliminated when compared to the conventional adhering process. In addition, the alignment of the first alignment mark and the second alignment mark is similar to the alignment of the upper and lower substrates of the liquid crystal display panel, and therefore it would have an alignment tolerance of less than about 5 µm.

Figure 2D:
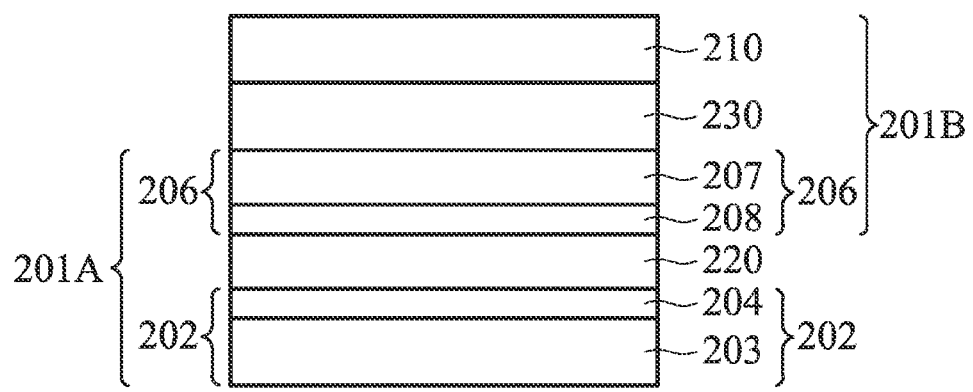
Figure 2E:
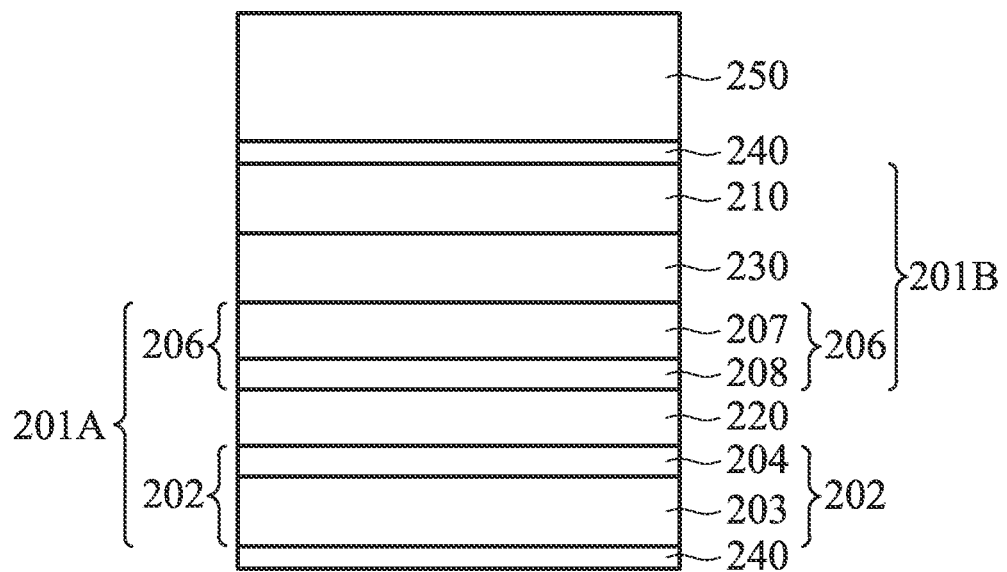

Then, referring to FIG. 2D, the first carrier 270 and the second carrier 280 are removed. In an embodiment, the first and second carriers 270 and 280 may be removed using a mechanical or chemical method. Finally, referring to FIG. 2E, a polarizer 240 is optionally adhered onto an opposite side of the first substrate 202 in contrast to display layer 220 and/or an opposite side of the third substrate 210 in contrast to the touch sensing layer 230. A protection layer 250 may be adhered onto the polarizer 240 on the third substrate 210 for providing sufficient physical protection to the liquid crystal display panel 201A and the touch panel 201B. The protection layer 250 may be a toughened glass which has a thickness of between about 0.3 mm and 0.5 mm and is hard enough to protect the layers below.

FIGS. 3A to 3D illustrate a method of fabricating a touch display apparatus including a liquid crystal panel in accordance with another embodiment of the present disclosure. In this embodiment, the second carrier may act as the protection layer. The same reference numerals represent similar or same features with preceding embodiments.

Figure 3A:
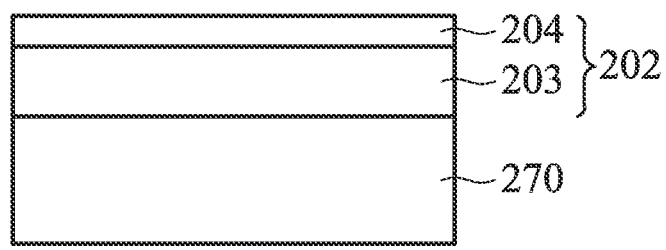
FIGS. 3A to 3D illustrate a method of fabricating a touch display apparatus including a liquid crystal panel in accordance with another embodiment of the present disclosure.
Figure 3B:
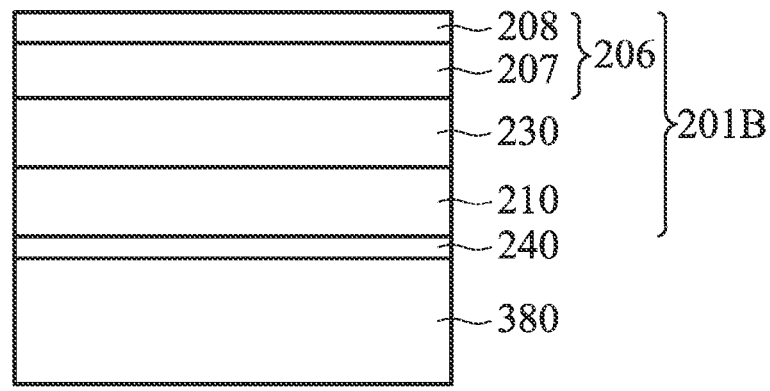

First, referring to FIG. 3A, a first carrier 270 and a first substrate 202 as shown in FIG. 2A are provided. The first substrate 202 may comprise a glass substrate 203 with a pixel array 204 formed thereon. Then, referring to FIG. 3B, an assembly part is disposed on the second carrier 380. The touch panel 201B may comprise a third substrate 210, a second substrate 206 and a touch sensing layer 230 interposed therebetween. The third substrate 210 may be relatively near the second carrier 380, and the second substrate 206 may be relatively far away from the second carrier 380. In addition, the third substrate 210 may have a second alignment mark. The second carrier 380 may be toughened glass having a thickness of between 0.3 mm and 0.5 mm and a sufficient hardness for acting as a protection covering to protect other features of the touch display apparatus. In addition, a polarizer 240 may be optionally adhered to the second carrier 380 before the disposition of the third substrate 210, the touch sensing layer 230 and the second substrate 206. The touch sensing layer 230 may comprise a sensing area (i.e., the sensing area shown in FIG. 1A) and a peripheral area surrounding the sensing area (i.e., the peripheral area shown in FIG. 1B). Sensing electrodes may be formed in the sensing area, and a first alignment mark may be formed in the peripheral area. The second substrate 206 may be directly disposed on the touch sensing layer 230 and may act as the common substrate of the touch panel 201B and the display panel 201A. The second substrate 206 may comprise a glass substrate 207 with a color filter 208 formed thereon.

Figure 3C:
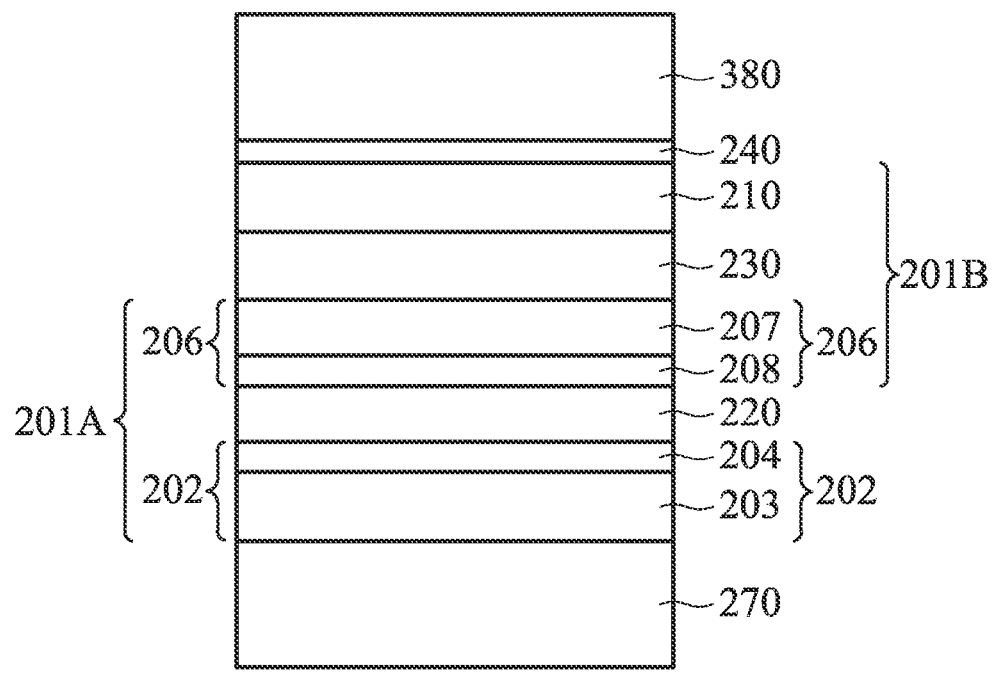
Figure 3D:
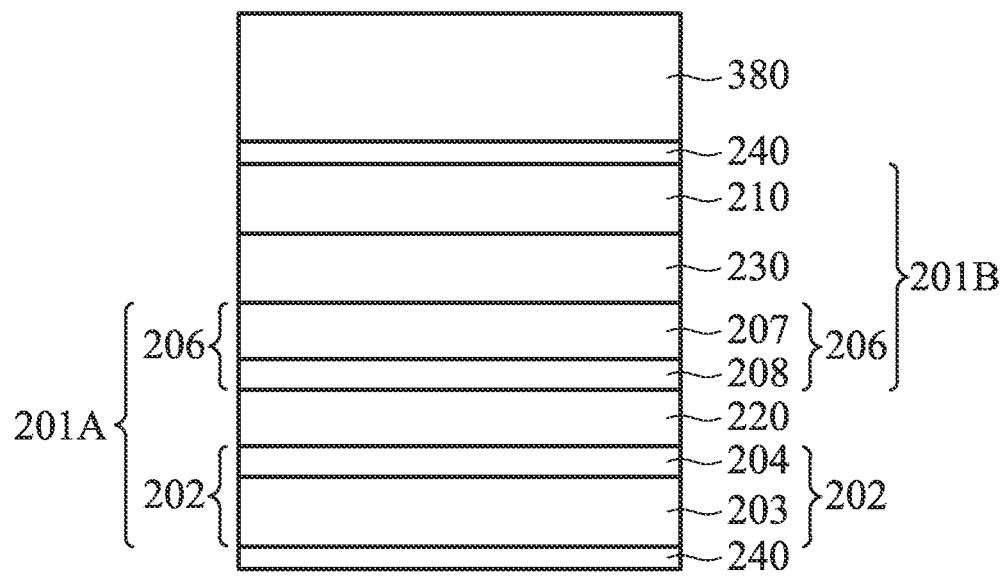

Then, referring to FIG. 3C, the first substrate 202 and the assembly part are assembled by aligning the first alignment mark and the second alignment mark to each other. For example, the second substrate 206 may be assembled onto the first substrate 202 by forming a display layer 220 therebetween, and a liquid crystal display panel 201A is formed. In this embodiment, the first substrate 202 and the second substrate 206 may have a gap therebetween after they are assembled to each other such that a liquid crystal material could be injected into the gap to form the liquid crystal display layer 220. Similar with the preceding embodiments, the second alignment mark in the touch sensing layer 230 may directly align to the first alignment mark in the pixel array 204, and therefore one or more aligning processes (e.g., aligning the color filter to the pixel array) could be eliminated when compared to the conventional adhering process. In addition, the alignment of the first alignment mark and the second alignment mark is similar to the alignment of the upper and lower substrates of the liquid crystal panel, and therefore it would have an alignment tolerance of less than about 5 µm.

FIGS. 4A to 4F illustrate a method of fabricating a touch display apparatus including an OLED panel in accordance with an embodiment of the present disclosure. In this embodiment, the display panel is an OLED display panel. The same reference numerals represent similar or same features with preceding embodiments.

Figure 4A:
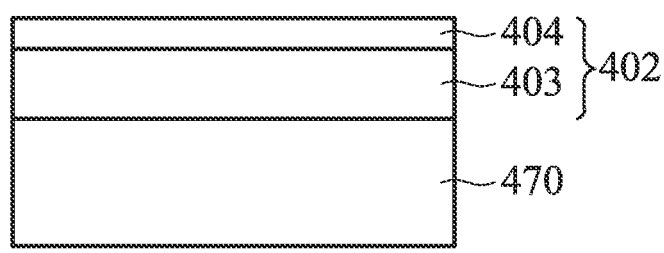
FIGS. 4A to 4F illustrate a method of fabricating a touch display apparatus including an OLED panel in accordance with an embodiment of the present disclosure.

First, referring to FIG. 4A, a first substrate 402 is formed on a first carrier 470. The first substrate 402 may comprise a glass substrate 403 with a pixel array 404 formed thereon. In an embodiment, the glass substrate 403 may comprise an ultra-thin glass having a thickness of less than 0.1 mm. In another embodiment, the glass substrate 403 may be a normal glass which is thinned to have a thickness of less than 0.3 mm by a thinning process. The thinning process may be a physical thinning method such as grinding or a chemical thinning method such as etching. The first carrier 470 may be a glass substrate having a sufficient mechanical support.

The pixel array 404 may be an active pixel array or a passive pixel array which forms an active pixel substrate or a passive pixel substrate with the glass substrate 403. The pixel array 404 may comprise a plurality of pixels. In the active pixel substrate, each pixel may have at least one TFT for receiving data signals and scanning signals and turn on/off the pixels. In addition, the pixel array 404 may further comprise a first alignment mark (not shown). The first alignment mark 404 may be disposed outside from the pixel areas, such as on any edges or corners, for being aligned with the touch panel. In an embodiment, the first alignment mark may comprise a shape of rectangular, circle, triangle, oblong, other polygons, other suitable shapes, or combinations thereof. In order to simplify the Figure to clarify, as shown in FIG. 4A, only a flattened layer is represented as the pixel array 404.

Figure 4B:
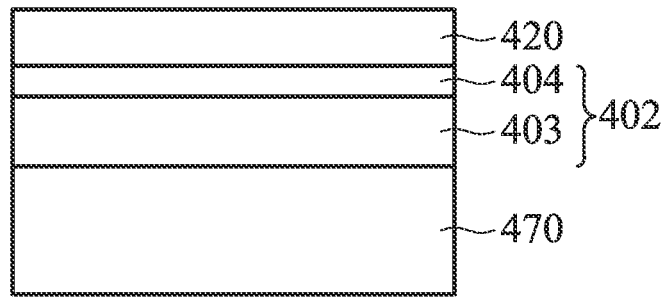

Referring to FIG. 4B, an OLED display layer 420 may be formed on the pixel array 404. The OLED display layer 420 may be an OLED array. The OLED array may comprise a plurality of OLEDs emitting white light, UV light or red/blue/green lights. The OLED may be any OLEDs produced by known art. For example, each OLED may comprise an electron injecting layer, an electron transporting layer, an organic emitting layer, a hole injecting layer, etc.

Figure 4C:
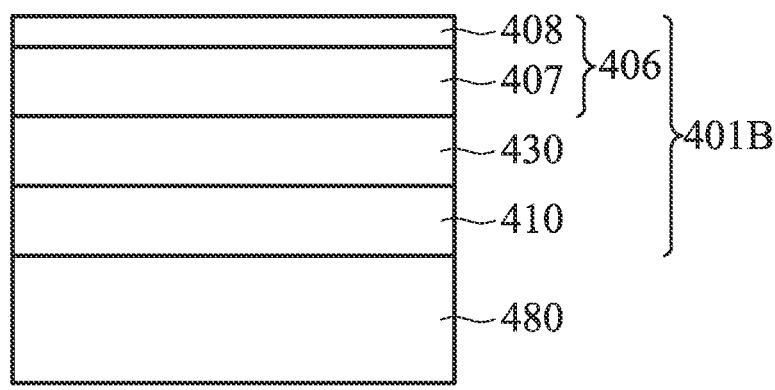

Then, referring to FIG. 4C, an assembled part is disposed on a second carrier 480. The assembly part 480 may be a touch panel 401B. The touch panel 401B may comprise a third substrate 410, a second substrate 406 and a touch sensing layer 430 interposed therebetween. The third substrate 410 may be relatively near the second carrier 480, and the second substrate 406 may be relatively far away from the second carrier 480. In addition, the third substrate 410 may have a second alignment mark. The second carrier 480 may be a glass substrate having sufficient mechanical support. The third substrate 410 may be a glass substrate or an organic film, such as a polyimide film or a polyethylene terephthalate (PET) film. The third substrate 410 may have a thickness of less than about 0.3 mm. The third substrate 410 may be formed on the second carrier 480 using a depositing or adhering method. The touch sensing layer 430 may comprise a sensing area (i.e., the sensing area shown in FIG. 1A) and a peripheral area surrounding the sensing area (i.e., the peripheral area shown in FIG. 1B). The sensing area may comprise a plurality of sensing electrodes arranged in rows and lines. The sensing electrodes may be formed of indium tin oxide (ITO), zinc indium oxide, tin cadmium oxide, zinc aluminum oxide, zinc tin indium oxide, zinc oxide, cadmium oxide, hafnium oxide, indium gallium zinc oxide, indium gallium zinc magnesium oxide, indium gallium magnesium oxide or indium gallium aluminum oxide. In an embodiment, the sensing electrodes may be the ITO. Note that in an embodiment, since the second alignment mark may be provided for the alignment of the first alignment mark, the second alignment mark may have the same size and shape with those of the first alignment mark. In order to simplify the Figure to clarify, as shown in FIG. 4C, only a flattened layer is represented as the touch sensing layer 430.

The second substrate 406 may be a transparent glass substrate 407 or a substrate 407 with a color filter 406 formed thereon. The second substrate 406 may be a common substrate of the touch panel 401B and the OLED display panel 401A. For example, the second substrate 406 may act as both the lower substrate of the touch panel 401B and the upper substrate of the OLED display panel 401A. The glass substrate may be an ultra-thin glass having a thickness of less than about 0.1 mm. Alternatively, the glass substrate 407 may be a normal glass which is thinned to have a thickness of less than 0.3 mm by a thinning process. The thinning process may be a physical thinning method such as grinding or a chemical thinning method such as etching. Note that whether the second substrate includes the color filter 408 or not, there is no need to form an alignment mark in the second substrate.

Figure 4D:
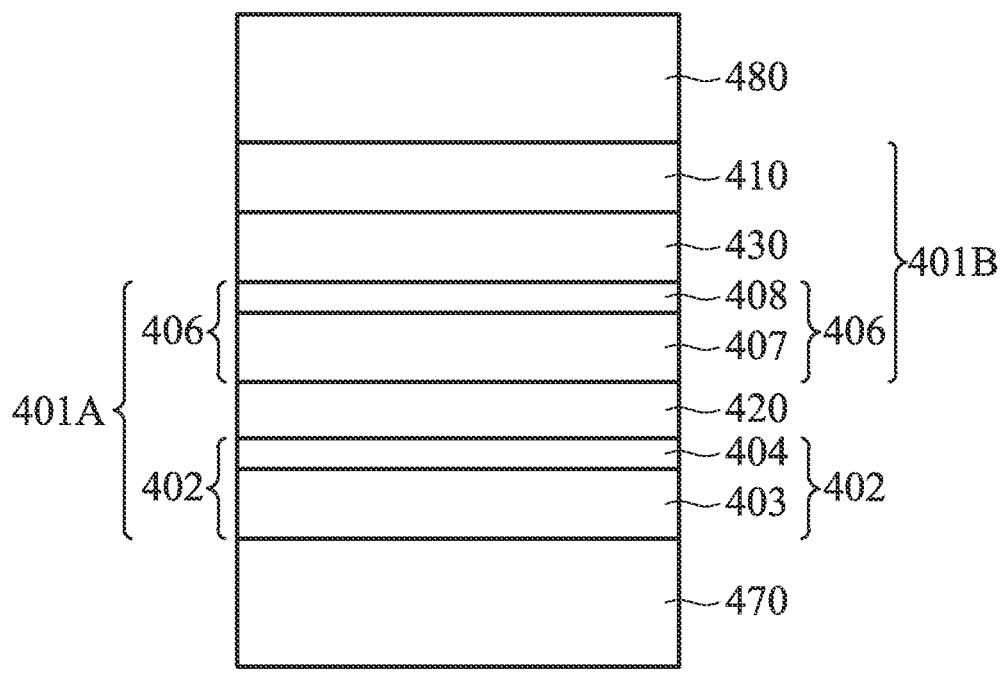

Then, referring to FIG. 4D, the first substrate and the assembly part are assembled by aligning the first alignment mark and the second alignment mark to each other. For example, the second substrate 406 is assembled onto the first substrate 402, and the OLED display panel 401A and the touch panel 401B are formed. In this embodiment, the second substrate 406 may be directly adhered to the OLED display layer 420. It should be noted that since the second substrate 406 is directly disposed on the touch sensing layer 430 and acts as the upper substrate of the OLED display panel 401A, the second alignment mark in the touch sensing layer 430 may directly align to the first alignment mark in the pixel array 404. Thus, one or more aligning processes (e.g., aligning the color filter to the pixel array) could be eliminated when compared to the conventional adhering process. In addition, the alignment of the first alignment mark and the second alignment mark is similar to the alignment of the upper and lower substrates of the OLED display panel, and therefore it would have an alignment tolerance of less than about 5 μm.

Figure 4E:
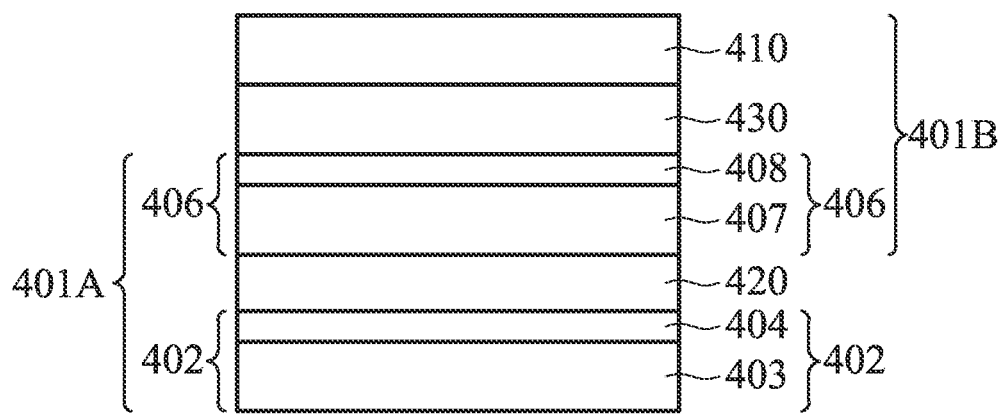
Figure 4F:
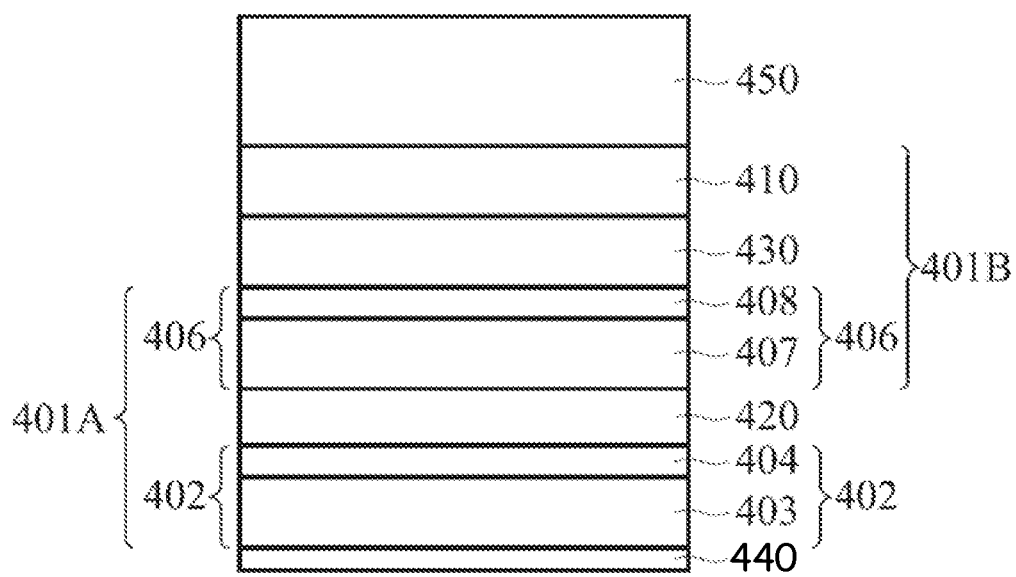

Then, referring to FIG. 4E, the first carrier 470 and the second carrier 480 are removed. In an embodiment, the first and the second carriers 470 and 480 may be removed using mechanical or chemical methods. Finally, referring to FIG. 4F, a polarizer 440 is optionally adhered onto an opposite side of the first substrate 402 in contrast to polarizer 440 and/or an opposite side of the third substrate 410 in contrast to the touch sensing layer 430. A protection layer 450 may be adhered onto the polarizer 440 on the third substrate 410 for providing sufficient physical protection to the OLED display panel 401A and the touch panel 401B. The protection layer 450 may be toughened glass which has a thickness of between about 0.3 mm and 0.5 mm and is hard enough to protect the layers below.

FIGS. 5A to 5E illustrate a method of fabricating a touch display apparatus including an OLED panel in accordance with another embodiment of the present disclosure. In this embodiment, the second carrier may act as the protection layer. The same reference numerals represent similar or same features with preceding embodiments.

Figure 5A:
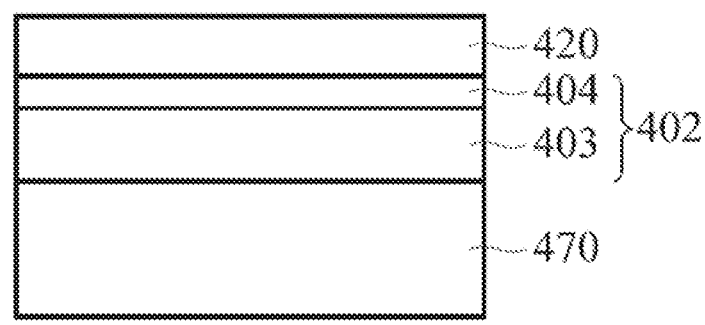
FIGS. 5A to 5D illustrate a method of fabricating a touch display apparatus including an OLED panel in accordance with another embodiment of the present disclosure.
Figure 5B:
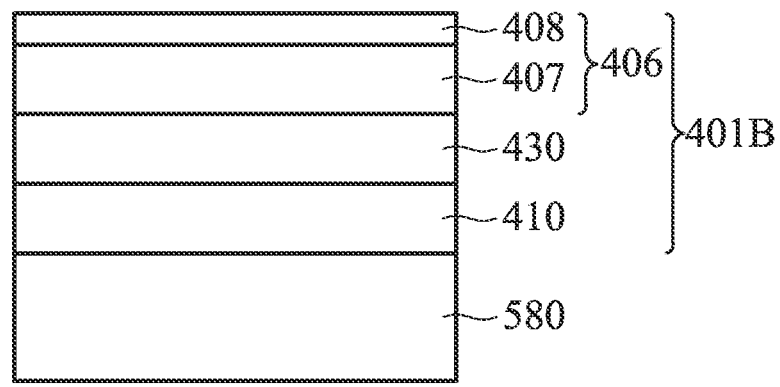

First, referring to FIG. 5A, a first carrier 470 and a first substrate 402 as shown in FIG. 4A are provided. The first substrate 402 may comprise a glass substrate 403 with a pixel array 404 formed thereon. The OLED display layer 420 may comprise an OLED array disposed on the first substrate 402. Then, referring to FIG. 5B, an assembly part is disposed on the second carrier 580. The assembly part may be a touch panel 401B. The touch panel 401B may comprise a third substrate 410, a second substrate 406 and a touch sensing layer 430 interposed therebetween. The third substrate 410 may be relatively near the second carrier 580, and the second substrate 406 may be relatively far away from the second carrier 580. In addition, the third substrate 410 may have a second alignment mark. Note that the second carrier 580 may be toughened glass for acting as a protection covering of the touch display apparatus. The second carrier 580 may have a thickness of between 0.3 mm and 0.5 mm and have a sufficient hardness to protect other features. The touch sensing layer 430 may comprise a sensing area (i.e., the sensing area shown in FIG. 1A) and a peripheral area surrounding the sensing area (i.e., the peripheral area shown in FIG. 1B). Sensing electrodes may be formed in the sensing area and a first alignment mark is formed in the peripheral area (not shown). The second substrate may be a transparent glass substrate 407 or a glass substrate 407 having a color filter 408 formed thereon. The second substrate 406 may be directly disposed on the touch sensing layer 430 and act as the common substrate of the touch panel and the display panel.

Figure 5C:
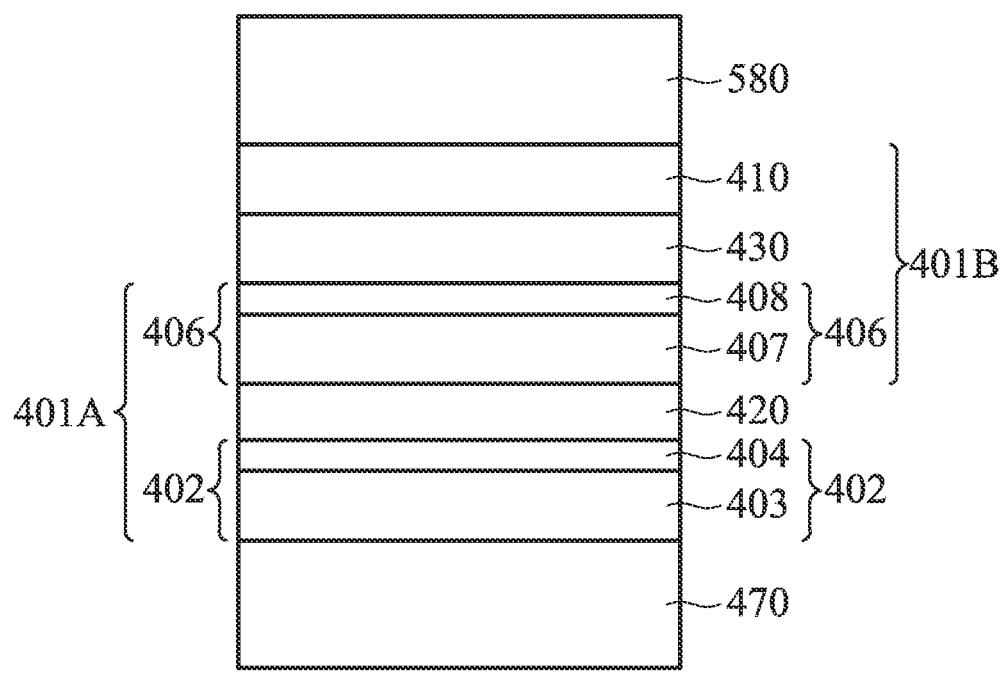

Then, referring to FIG. 5C, the first substrate and the assembly part are assembled by aligning the first alignment mark and the second alignment mark to each other. For example, the second substrate 406 is assembled onto the first substrate 402, and the display panel 401A and the touch panel 401B are formed. In an embodiment in which the second substrate 406 does not include the color filter, the glass substrate 407 is directly adhered to the OLED display layer 420. In an embodiment in which the second substrate 406 includes the color filter, the color filter 408 is directly adhered to the OLED display layer 420. It should be noted that since the second substrate 406 is directly disposed on the touch sensing layer 430 and acts as the upper substrate of the OLED display panel 401A, the second alignment mark in the touch sensing layer 430 may directly align to the first alignment mark in the pixel array 404. Thus, one or more aligning processes (e.g., aligning the color filter to the pixel array) could be eliminated when compared to the conventional adhering process. In addition, the alignment of the first alignment mark and the second alignment mark is similar to the alignment of the upper and lower substrates of the liquid crystal panel, and therefore it would have an alignment tolerance of less than about 5 μm.

Figure 5D:
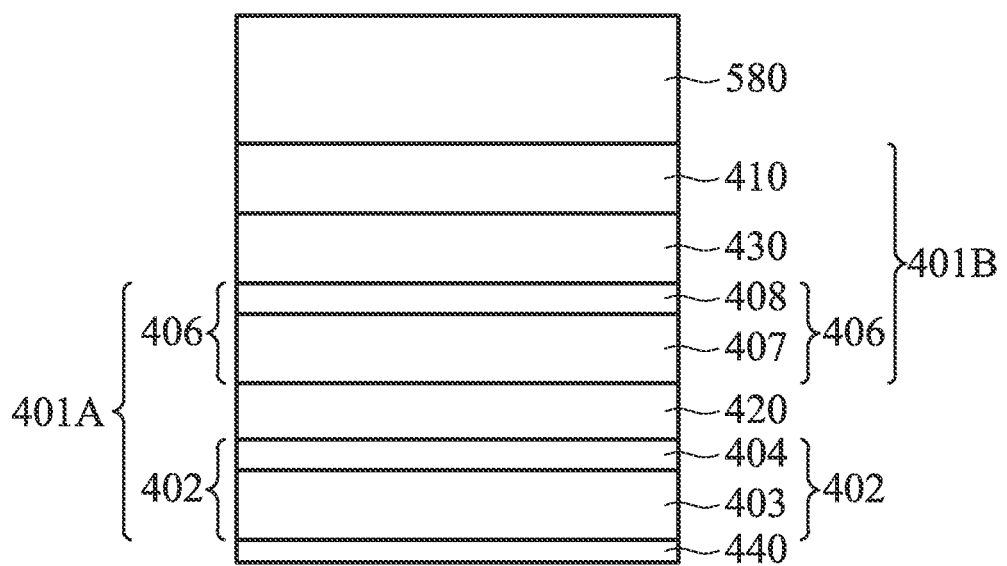

Then, referring to FIG. 5D, the first carrier 470 is removed. The second carrier 580 remains to act as a protective layer. The first carrier 470 may be removed by a mechanical or chemical method.

While the preferred embodiments of the invention have been described above, it will be recognized and understood that various modifications can be made to the invention and the appended claims are intended to cover all such modifications which may fall within the spirit and scope of the invention.

What is claimed is:

1. A touch display apparatus, comprising:
a display layer between a first substrate and a second substrate;
a touch sensing layer disposed over the second substrate;
a third substrate disposed on the touch sensing layer and having a thickness of less than 0.3 mm, wherein the first substrate has a first alignment mark and the third substrate has a second alignment mark, and the second substrate does not comprise an alignment mark; and
a protection layer disposed on the third substrate.

2. The touch display apparatus according to claim 1, wherein the first alignment mark and the second alignment mark are aligned to each other with an alignment tolerance of less than about 5 μm.

3. The touch display apparatus according to claim 1, wherein the second substrate further comprises a color filter.

4. The touch display apparatus according to claim 1, wherein the first substrate and the second substrate have a thickness of less than about 0.3 mm.

5. The touch display apparatus according to claim 1, wherein each of the first, the second and the third substrates has a thickness of less than about 0.1 mm.

6. The touch display apparatus according to claim 1, wherein each of the first, the second and the third substrates is a glass substrate.

7. The touch display apparatus according to claim 1, wherein the display layer comprises a liquid crystal layer or an OLED array.

8. The touch display apparatus according to claim 1, wherein the protection layer comprises a toughened glass.

* * * * *